US010447812B2

(12) United States Patent
Lewallen et al.

(10) Patent No.: US 10,447,812 B2
(45) Date of Patent: Oct. 15, 2019

(54) ON DEMAND RESOURCES (71) Applicant: Apple Inc., Cupertino, CA (US)

(72) Inventors: Stephen Richard Lewallen, San Jose, CA (US); David Makower, Milpitas, CA (US); Jonathan Joseph Hess, Los Altos, CA (US); Patrick Heynen, Redwood City, CA (US); Terry J. Santamaria, San Francisco, CA (US); William M. Bumgarner, San Jose, CA (US); David Pickford, San Jose, CA (US); Christopher L. Oklota, San Francisco, CA (US); Anthony S. Parker, Cupertino, CA (US)

(73) Assignee: Apple Inc., Cupertino, CA (US)

(*) Notice: Subject to any disclaimer, the term of this patent is extended or adjusted under 35 U.S.C. 154(b) by 273 days.

(21) Appl. No.: 14/861,405

(22) Filed: Sep. 22, 2015

(65) Prior Publication Data
US 2016/0357544 A1 Dec. 8, 2016

Related U.S. Application Data (60) Provisional application No. 62/171,894, filed on Jun. 5, 2015.

(51) Int. Cl.
H04L 29/08 (2006.01)
G06F 16/28 (2019.01)
(Continued)

(52) U.S. Cl.
CPC ............ H04L 67/34 (2013.01); G06F 8/61 (2013.01); G06F 16/285 (2019.01); G06F 9/44521 (2013.01)

(58) Field of Classification Search
CPC .. G06F 8/61; G06F 9/44521; G06F 17/30598; H04L 67/34
(Continued)

(56) References Cited

U.S. PATENT DOCUMENTS 5,483,261 A  1/1996 Yasutake
5,488,204 A  1/1996 Mead et al.
(Continued)

FOREIGN PATENT DOCUMENTS

EP  1 076 290 B1  2/2001
JP  2000-163031 A  6/2000
(Continued)

OTHER PUBLICATIONS

Non-Final Office Action dated Dec. 3, 2015, filed Sep. 22, 2015, for U.S. Appl. No. 14/861,885, ten pages.
(Continued)

Primary Examiner — Ryan D. Coyer
(74) Attorney, Agent, or Firm — Kubota & Basol LLP (57) ABSTRACT A computer-implemented method for building a software application is disclosed. The method includes: generating a plurality of application resources; creating a plurality of tags; applying one of the tags on each of the plurality of application resources; grouping the application resources by their tags to form at least two asset packs, each identifiable by at least one tag shared by all application resources in the asset pack; and creating an asset pack manifest comprising a location of each of the asset packs and an order in which the asset packs are to be downloaded.

20 Claims, 4 Drawing Sheets (51) Int. Cl.
*G06F 8/61* (2018.01)
*G06F 9/445* (2018.01)

(58) Field of Classification Search
USPC .......................................................... 717/169
See application file for complete search history.

(56) References Cited

U.S. PATENT DOCUMENTS

| | | | |
|---|---|---|---|
| 5,825,352 A | 10/1998 | Bisset et al. | |
| 5,835,079 A | 11/1998 | Shieh | |
| 5,880,411 A | 3/1999 | Gillespie et al. | |
| 5,944,821 A * | 8/1999 | Angelo | G06F 21/51 |
| | | | 726/22 |
| 6,188,391 B1 | 2/2001 | Seely et al. | |
| 6,195,678 B1 | 2/2001 | Komuro | |
| 6,310,610 B1 | 10/2001 | Beaton et al. | |
| 6,323,846 B1 | 11/2001 | Westerman et al. | |
| 6,690,387 B2 | 2/2004 | Zimmerman et al. | |
| 7,015,894 B2 | 3/2006 | Morohoshi | |
| 7,069,293 B2 | 6/2006 | Cox et al. | |
| 7,184,064 B2 | 2/2007 | Zimmerman et al. | |
| 7,222,341 B2 * | 5/2007 | Forbes | G06F 8/61 |
| | | | 717/169 |
| 7,663,607 B2 | 2/2010 | Hotelling et al. | |
| 7,711,775 B2 * | 5/2010 | Tavis | G06F 8/65 |
| | | | 709/201 |
| 7,730,164 B1 | 6/2010 | Palaniappan | |
| 8,029,365 B2 | 10/2011 | Burke et al. | |
| 8,074,217 B2 * | 12/2011 | James | G06F 8/60 |
| | | | 717/169 |
| 8,356,099 B2 | 1/2013 | Bello | |
| 8,479,122 B2 | 7/2013 | Hotelling et al. | |
| 8,635,360 B2 | 1/2014 | Brase et al. | |
| 8,776,254 B1 * | 7/2014 | Mraz | H04L 63/123 |
| | | | 713/150 |
| 8,789,040 B1 | 7/2014 | Callary | |
| 9,092,286 B2 | 7/2015 | Sprigg | |
| 2003/0191716 A1* | 10/2003 | Woods | G06F 21/6218 |
| | | | 705/50 |
| 2004/0003390 A1 | 1/2004 | Canter et al. | |
| 2004/0139430 A1* | 7/2004 | Eatough | G06F 8/68 |
| | | | 717/174 |
| 2004/0237082 A1 | 11/2004 | Alcazar et al. | |
| 2004/0237083 A1 | 11/2004 | Alcazar et al. | |
| 2005/0033728 A1 | 2/2005 | James et al. | |
| 2005/0091535 A1* | 4/2005 | Kavalam | G06F 8/62 |
| | | | 726/4 |
| 2005/0132357 A1* | 6/2005 | Shell | G06F 21/121 |
| | | | 717/174 |
| 2005/0282636 A1 | 12/2005 | O'Brien | |
| 2005/0289535 A1* | 12/2005 | Murray | G06F 8/61 |
| | | | 717/172 |
| 2006/0136728 A1* | 6/2006 | Gentry | H04L 9/3242 |
| | | | 713/176 |
| 2006/0197753 A1 | 9/2006 | Hotelling | |
| 2007/0197202 A1 | 8/2007 | Sprigg et al. | |
| 2008/0215796 A1* | 9/2008 | Lam | G06F 9/44505 |
| | | | 711/100 |
| 2010/0211941 A1 | 8/2010 | Roseborough | |
| 2010/0318985 A1 | 12/2010 | Moffatt et al. | |
| 2011/0214184 A1* | 9/2011 | Whitehouse | G06F 21/53 |
| | | | 726/24 |
| 2012/0117214 A1* | 5/2012 | Mengle | G06F 9/5055 |
| | | | 709/223 |
| 2012/0198434 A1* | 8/2012 | Dirstine | G06F 8/65 |
| | | | 717/170 |
| 2013/0054960 A1* | 2/2013 | Grab | G06F 21/10 |
| | | | 713/155 |
| 2013/0219383 A1 | 8/2013 | Hilerio et al. | |
| 2013/0263088 A1 | 10/2013 | Hoff et al. | |
| 2015/0095653 A1* | 4/2015 | Shim | G06F 21/125 |
| | | | 713/181 |
| 2016/0021170 A1* | 1/2016 | Mosko | G06F 17/3089 |
| | | | 709/217 |

FOREIGN PATENT DOCUMENTS

| | | |
|---|---|---|
| JP | 2002-342033 A | 11/2002 |
| KR | 20110069718 A | 6/2011 |
| KR | 20110082585 A | 7/2011 |
| WO | 2000033565 A2 | 6/2000 |

OTHER PUBLICATIONS

International Search Report dated Aug. 9, 2016, for PCT Application No. PCT/US2016/034767, filed May 27, 2016, six pages.
Final Office Action dated Oct. 3, 2016, for U.S. Appl. No. 14/861,885, filed Sep. 22, 2015, nine pages.
Non-Final Office Action dated Mar. 23, 2017, filed Sep. 22, 2015, for U.S. Appl. No. 14/861,885, ten pages.
Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.
Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.
Rubine, D.H. (May 1992). "Combining Gestures and Direct Manipulation," CHI '92, pp. 659-660.
Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.
Final Office Action dated Jun. 15, 2016, filed Sep. 22, 2015, for U.S. Appl. No. 14/861,885, six pages.
Notice of Allowance dated Sep. 22, 2017, for U.S. Appl. No. 14/861,885, filed Sep. 22, 2015, five pages.
Notice of Allowance, (Corrected) dated Oct. 10, 2017, for U.S. Appl. No. 14/861,885, filed Sep. 22, 2015, two pages.

* cited by examiner

ON DEMAND RESOURCES

CROSS REFERENCE TO RELATED APPLICATIONS

This Application claims the benefit of U.S. Provisional Application No. 62/171,894 filed on Jun. 5, 2015, the entire disclosure of which is herein incorporated by reference for all purposes.

FIELD OF THE DISCLOSURE

This disclosure relates generally to systems and methods of building software applications, and more particularly, to building, deploying, running, and updating a software application with on demand resources that can be decoupled from the main application and other resources of the application so that these on demand resources can be requested and purged dynamically on an as-needed basis without disrupting the operation of the application.

BACKGROUND

Computing devices, especially small mobile devices, can have a limited amount of resources such as disk space for storing applications and data. Every time an application is installed on a computing device, it reduces the storage space available for other uses. Conventionally, each application is packed in a single app bundle that can be downloaded and installed on a client device. The single app bundle can include most, if not all, of its code and data, even though not all of them are needed at a given time when the application is in use. Some of the code and data may never get utilized, but nevertheless can occupy on-device storage space for as long as the application lives on the client device. This can be an inefficient use of the valuable storage space on the client device and limit the number of applications that can be installed on the device. Given that the applications, even those designed to run on mobile devices, can be of significant sizes, it is desirable to design and construct applications so as to minimize the waste of disk space when the applications are installed on the device without negatively affecting their usability.

SUMMARY

One aspect of the disclosure is generally directed to systems and methods of building and deploying a software application that enables various application resources (i.e., on demand resources) associated with the application to be packaged separately, which in turn allows them to be installed and uninstalled from a client device individually without disrupting the use of the application and on an as-needed basis. The installing and uninstalling process can occur in the background and be transparent to the user. This allows applications, especially those with relatively large amounts of content, to reside and operate on a client device without consuming a significant amount of storage space. In turn, this can provide flexibility to the device so that it can better accommodate other applications and data. As such, this can provide a significant advantage over conventional applications that typically require a full download and installation of all of their files, which have to be kept on the client device regardless of whether they are actually needed.

In comparison, the applications built with on demand resources may only require a fraction of the storage space on the device to operate without sacrificing any user experience pertaining to the application. The on demand resources not initially installed can be requested at a later time, preferably before they are needed by the application. Similarly, some of these on demand resources that have been installed on the device can be removed when no longer needed and/or when there is a shortage of disk space. Essentially, various application resources associated with an application can be rotated on and off the device, based on the application's needs, so as to achieve optimal utilization of the finite amount of disk space of the device.

Another aspect of the disclosure generally relates to automatically requesting and/or removing on demand resources based on a need (or expected need) of the application/client device. For an application built with on demand resources, it can be critical to be able to anticipate when a particular on demand resource will likely be needed. This allows it to be fetched before getting called upon by the application, thus eliminating the need to make the user wait until the resources are downloaded. It can also prevent potential runtime errors from occurring. It can be equally critical to know which on demand resources can be purged when storage space becomes tight. In this aspect, some embodiments disclose methods of predetermining or dynamically determining criteria for requesting on demand resources. Other embodiments disclose methods of identifying and/or prioritizing the on demand resources already on the device for removal when requested.

Yet another aspect of the disclosure generally relates to an application program interface (API) and other software development tools that are designed to build applications with on demand resources and facilitate operation of these applications on a client device.

DETAILED DESCRIPTION

In the following description of example embodiments, reference is made to the accompanying drawings in which it is shown by way of illustration specific embodiments that can be practiced. It is to be understood that other embodiments can be used and structural changes can be made without departing from the scope of the various embodiments.

As used herein, the terms "device" and "client device" can be used interchangeably to refer to any electronic devices capable of running one or more software applications. Such devices can include, but are not limited to, personal computers (PCs), Macs, desktop and laptop PCs, tablet PCs, smartphones and other types of cellular phones, wearable devices, set top boxes, smart TVs, digital media players, and in-car entertainment systems. As used herein, the terms "storage space," "disk space" and "storage medium" can be used interchangeably to refer to any type of storage on a client device. The storage space can be either internal (e.g., memory, hard drive, flash drive, and cache storage) or external (e.g., cloud storage). The term "software application," "application," and "app" can be used interchangeably to refer to any computer program that can be installed and executed on a device.

The term "application resource" (or "resource") can refer to any data (or content) associated with an application. In one embodiment, application resources can exclude the software code (or programs) for running the application. The software code or programs can include, for example, executable files, functions, and libraries. Examples of application resources can include, but not limited to, image, text, audio, and video files (i.e., any file not software code). In another embodiment, application resources can also include at least some of the software code for running the application. The term "asset pack" can refer to a collection of one or more application resources that share at least one common trait. The term "app start bundle" can refer to a bundle of code and optionally a number of application resources required for starting the application for the first time on a client device. The code and resources in the app start bundle are needed to perform the most basic functions of the application such as launching the application and displaying the default screen of the application.

The term "on demand resource" can refer to one or more application resources that can be dynamically requested and purged without disrupting the running of the application. These on demand resources can include resources that are not included in the app start bundle (e.g., resources in asset packs that can be downloaded by request of the app when the app is running) Additionally or alternatively, they can include resources that are part of the app start bundle but can be purged when no longer needed. Additionally or alternatively, they can include resources in asset packs that are selected to be installed after the initial app and on demand resource (ODR) installation, yet still before the app is launched. The on demand resources can include data and/or code. The on demand resources can be grouped into one or more asset packs when the application is compiled but stored separately from the app start bundle and thus may not be a part of the initial download to the client device when the application is first requested. Instead, the asset packs with the on demand resources can be requested individually after the installation of the application on an as-needed basis. Once installed, they can be integrated into the application and perform their intended functions. When they are no longer needed by the application and/or there is a shortage of space on the client device, the on demand resources can be purged from the device individually in a predetermined order (e.g., an order based on heuristics used to determine what is least likely to be needed) without disrupting the running of the application. In some implementations, particular on demand resources are purged and other on demand resources are not purged.

The terms "server" or "remote server" can be used interchangeably to generally refer to one or more computers from which applications including their app start bundles, asset packs, and/or other resources can be obtained. The server can be connected to one or more client devices via any type of known network.

One aspect of the disclosure is generally directed to systems and methods of building and deploying a software application that enables various application resources (i.e., on demand resources) associated with the application to be packaged separately, which in turn allows them to be installed and uninstalled from a client device individually without disrupting the use of the application. The installing and uninstalling process can occur in the background and be transparent to the user. This allows applications, especially those with relatively large amounts of content, to reside and operate on a client device without consuming a significant amount of storage space. In turn, this can provide flexibility to the device so that it can better accommodate other applications and data. As such, this can provide a significant advantage over conventional applications that typically require a full download and installation of all of their files, which have to be kept on the client device regardless of whether they are actually needed.

In comparison, the applications built with on demand resources may only require a fraction of the storage space on the device to operate without sacrificing any user experience pertaining to the application. The on demand resources not initially installed can be requested at a later time, preferably before they are needed by the application. Similarly, some of these on demand resources that have been installed on the device can be removed when no longer needed and/or when there is a shortage of disk space. Essentially, various application resources associated with an application can be rotated on and off the device, based on the application's needs, so as to achieve optimal utilization of the finite amount of disk space of the device. Also because not the entire application needs to be downloaded before it can be used, the time between starting downloading the application and being able to launch the application can be dramatically shortened.

Another aspect of the disclosure generally relates to automatically requesting and/or removing on demand resources based on a need (or expected need) of the application/client device. For an application built with on demand resources, it can be critical to be able to anticipate when a particular on demand resource will likely be needed. This allows it to be fetched before getting called upon by the application, thus eliminating the need to make the user wait until the resources are downloaded. It can also prevent potential runtime errors from occurring. It can be equally critical to know which on demand resources can be purged when storage space becomes tight. In this aspect, some embodiments disclose methods of predetermining or dynamically determining criteria for requesting on demand resources. Other embodiments disclose methods of identifying and/or prioritizing the on demand resources already on the device for removal when requested.

Yet another aspect of the disclosure generally relates to an application program interface (API) and other software development tools that are designed to build applications with on demand resources and facilitate operation of these applications on a client device.

The following paragraphs discuss various embodiments of building and deploying software applications with on demand resources. Instead of including all resources (e.g., data, content, and/or code) associated with an application in a single application bundle, an exemplary application in one embodiment can be built with its application resources grouped into multiple asset packs, all of which can be a part of the application at compile time, but made available for download on their own, separate from the rest of the application.

As defined above, application resources can include any data (also referred to as content) and/or code associated with an application. In one embodiment, each data (or content) file can correspond to one application resource. In another embodiment, multiple files such as files in the same directory can constitute one application resource. Some of the application resources can be characterized as on demand resources, which are only needed at certain stage during the operation of the application. The on demand resources are typically not required to launch the application. The application resources can usually be associated with one particular application, but they can be shared by multiple applications.

Figure 1:
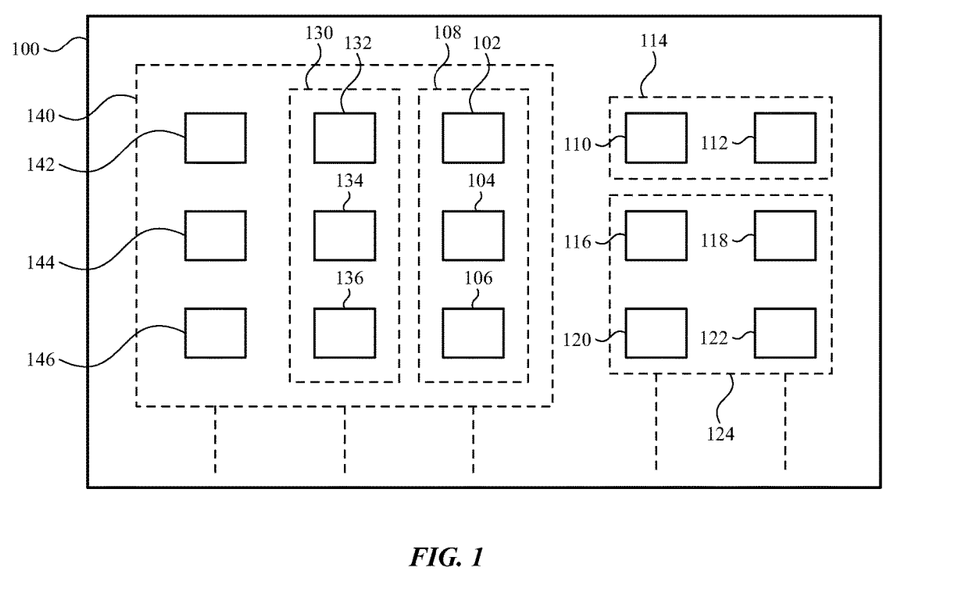
FIG. 1 is a block diagram illustrating the makeup of an application with on demand resources, according to an embodiment of the disclosure.

FIG. 1 illustrates the exemplary structure of an application with on demand resources, according to an embodiment of the disclosure. Application 100 can include multiple files 102, 104, 106, 110, 112, 116, 118, 120, 124. These files can be of different types. Some of them can be code and others can include data (e.g., images, videos, texture files, music, and sound effects). In this example, each data file can correspond to one application resource. Application 100 can be built using an API and other software development tools (discussed in detail below) provided to developer. One of the tools can allow the developer of the application to define a number of tags. The tags can be arbitrarily identified in any way intended by the developer. Any number of tags can be created for an application. Preferably, each tag (or combination of tags) can be used for associating a set of application resources by one common trait. In other words, the value of each tag (or combination of tags) in the set of tags can correspond to an identifier assigned to a logical grouping of multiple application resources.

As an example, application 100 of FIG. 1 can be a multi-level video game that requires a player to complete one level before moving on to the next. A tag can be created for each level in the game to designate the application resources required in that level. For example, files 102, 104, and 106 can be image files required to render the virtual environment of level 1. These files can be application resources required in level 1. As such, they can be applied with the "Level 1" tag. Similarly, files 110 and 112 can be applied with a "Level 2" tag and files 116, 118, 120, and 122 can be applied with a "Level 3" tag. Other resources can be level-independent, but possess some other identifiable traits and can be tagged accordingly. It should be understood that the same tag can be applied to different application resources and each application resource can be associated with more than one tag. For example, one of the images can appear in both Levels 1 and 2 and thus can be tagged with both "Levels 1" and "Level 2." This can eliminate duplicating the same application resource for the different levels.

After the application resources (or files) are tagged, the ones sharing a common tag (or tags) can be placed into an asset pack. For example, as illustrated in FIG. 1, asset pack 108 can include files 102, 104, and 106, which constitute the collection of application resources required in level 1 of the game. Asset pack 114 can include files 110, 112, the two "Level 2" application resources. Similarly, asset pack 124 can include files 116, 118, 120, 122, the "Level 3" resources in the game. The application resources in one or more of asset packs 108, 114, and 124 can be on demand resources, some of which (e.g., asset packs 114 and 124) may not be a part of the initial download package (app start bundle) when the application is first requested by a client device.

In addition, there can also be a base resources pack 130 that includes the application resources 132, 134, 136 required to perform basic functions in the game every time the game is launched. For example, the base resources pack 130 can include, for example, the opening scene of the game, various menus and option settings of the game, at least one avatar that can be selected and controlled by the user, and any other resources that are utilized throughout the game regardless of the user's progress in the game. That is, these resources 132, 134, 136 are not specific to any of the levels in the game. In addition, the game can also include files 142, 144, 146 that are software code (e.g., executables) for launching the game and performing various operations in the game. These files can be included in the app start bundle (and excluded from the asset packs). In other embodiments, application resources sharing multiple tags can similarly form an asset pack in a way similar to resources sharing only one tag.

Although the asset packs in FIG. 1 are shown to include only a few exemplary application resources, it should be understood that each asset pack can include any number of application resources. Moreover, an application can include any number of asset packs. Each of the asset packs can be individually requested by the application when the resources in the asset pack are in demand. This allows the asset packs to be downloaded and installed (or purged) on an as-needed basis after the initial installation of the application.

Figure 2:
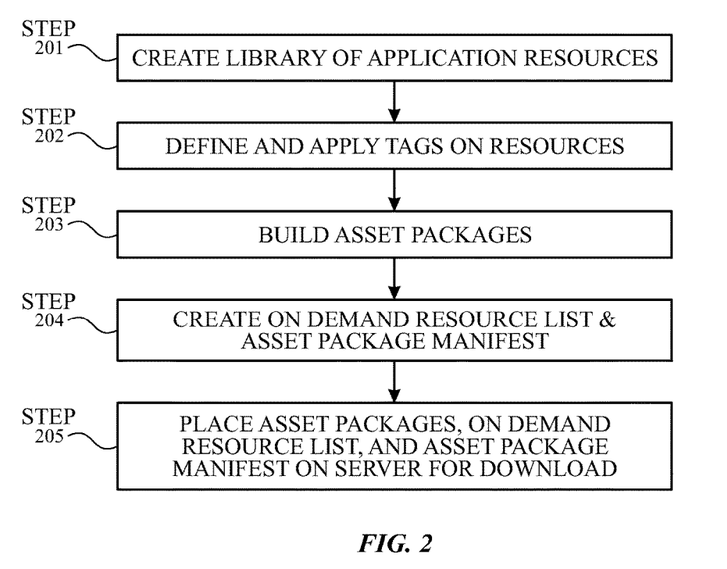
FIG. 2 illustrates the exemplary steps in a method of constructing an application with on demand resources, according to an embodiment of the disclosure.

FIG. 2 illustrates the exemplary steps in a method of constructing an application with on demand resources, according to an embodiment of the disclosure. First, the developer can create a library of the application resources and code that together make up the application (step 201). Then, the developer can define a set of tags and apply them to the various application resources (step 202). After the application resources are tagged, the developer can build asset packs (step 203). Each asset pack can include one or more application resources that share at least one common tag (or combination of tags). This allows each asset pack to be identified by the common tag (or combination of tags) associated with the application resources in the asset pack. In other words, the tag (or combination of tags) can be used as the identifiers of the asset packs. This can also enable the application to request asset packs associated with a particular tag (or combination of tags). In one embodiment, each application resource can land in exact one asset pack. One or more of the steps of defining tags, applying them to the various application resources, and building asset packs can be implemented using any suitable software/application development tool such as Xcode.

Once the asset packs are built, the application resources in the asset packs can be in a format that can be accessed by the application when called upon. As illustrated in FIG. 1, the asset packs can have different sizes (i.e., there is no restriction on the size of the asset pack or the way the application resources are constructed). In other embodiments, each asset pack can be required to have certain size restrictions. These restrictions can help predict the network bandwidth requirement for transmitting the asset packs from a server to a client device and also the amount of disk space on the client device to store these asset packs.

Referring again to FIG. 2, two lists, an On Demand Resources List and an Asset Pack Manifest can also be created when the asset packs are built (step 204). In this embodiment, these two lists can be created as property list files (e.g., p-list files with filename extension .plist). However, it should be understood that they can be in any suitable file format. The On Demand Resources List can provide a mapping of the various application resources to their respective asset packs. Because each of the application resources has already been tagged, the On Demand Resources List can also identify the tag (or combination of tags) associated with each of the asset packs. A server can use the On Demand Resources List to identify the asset packs when it receives one or more tags as a part of a request for on demand resources. For example, the On Demand Resources List can identify the level 2 asset packs when it receives a request with the "Level 2" tag from the client device.

The Asset Pack Manifest can indicate an address on the network from where each requested asset pack can be downloaded. In one embodiment, the addresses in the Asset Pack Manifest can include a list of uniform resource locators (URLs) that specify the location of the asset packs. In other embodiments, the locations specified in the Asset Pack Manifest can include, for example, IP addresses, server addresses, domain names, directory names, etc. Essentially, the Asset Pack Manifest can serve as the glue between the application and its asset packs. Additionally, the Asset Pack Manifest can also include metadata specifying various properties associated with each asset pack. For example, the metadata can include the size of the asset pack and the preferred order in which they are to be fetched by the application. Additionally or alternatively, the metadata can indicate the conditions to be satisfied before downloading certain asset packs (e.g., the download order of the asset packs as level 1 first, followed by level 2, and then level 3). As discussed in detail below, the Asset Pack Manifest can also include content hashes that can be used to verify the version of the asset pack and determine whether a new version needs to be downloaded. In one embodiment, the Asset Pack Manifest is not included in the initial download of the application and has to be requested separately and refreshed regularly to ensure that the application is entitled to get the asset packs it is requesting and also that the correct asset packs are released to the application. Requiring the Asset Pack Manifest to be downloaded separately from the app start bundle is preferred when the application is hosted at an app store. In another embodiment, while no Asset Pack Manifest is included in the application, a URL to the Asset Pack Manifest can be inserted into an installer manifest as a part of the app start bundle. This URL can support the initial installation of the application along with the prefeteched on demand resources. This embodiment can be preferred when the Asset Pack Manifest is hosted on a continuous integration server or an internal enterprise server. In another embodiment, the Asset Pack Manifest can be embedded in the ODR application and downloaded to the client device. The Asset Pack Manifest can also be embedded in the application when a random web server hosts the asset packs. In yet another embodiment, a template of the Asset Pack Manifest rather than a complete Asset Pack Manifest with URLs can be embedded in the application. This arrangement can be preferred if the actual URLs (or other types of addresses of the on demand resources) are not yet finalized when the application is first downloaded. The template can be updated at a later time when the URLs are finalized.

Although FIG. 2 shows that the step of generating the On Demand Resource List and the Asset Pack Manifest (step 204) follows the step of generating the asset packs (step 203), it should be understood that these steps can take place concurrently where the lists are generated as the asset packs are being built. In one embodiment, steps 201-204 can be performed in an integrated development environment (IDE), such as Apple's Xcode.

After the asset packs, the On Demand Resources List, and the Asset Pack Manifest are created, they can be placed in an archive on a server along with the rest of the application (e.g., the app start bundle), and the application can be made available in for download (step 205).

In one embodiment, when the application and the associated asset packs arrive from the server, they can be individually signed with a code signature. If the code signature of one asset pack does not match with the signature of the rest of the application, it can be determined that the asset pack has been tampered with and a replacement is required. Additionally or alternatively, if the application is being offered in an app store, the asset packs and the rest of the application can be signed with an app store signature, which can indicate that the application is offered by the app store rather than by, for example, the developer directly.

As mentioned above, a conventional application is typically downloaded in a single bundle including most if not all of its application resources (e.g., code and data). The single app bundle can be unpacked to install the application on the client device. The installation process typically involves copying the application resources from the app bundle onto the storage space of the client device. After a successful installation, the application can be launched to perform its designed functions. Normally, not all application resources are utilized at all times when the application is running Nevertheless, they would occupy a portion of the storage space on the client device as long as the application is not deleted from the device. Large applications can take up a significant portion of the storage space on the client device, especially devices with a limited amount of space. When a conventional application is uninstalled to free up disk space, the entire application has to be purged.

In contrast, in the embodiments of the present disclosure, the application resources can be grouped into a number of asset packs as discussed above. One or more of the asset packs can be included in an app start bundle. When a client device requests the application for the first time, the app start bundle is sent to the client device while other asset packs including on demand resources can remain on the server. Preferably, the app start bundle includes only the software code and application resources that are required to run the application initially. For example, referring back to FIG. 1, an app start bundle 140 of the video game application 100 can include only the files 142, 144, 146, the base resources pack 130, and the level 1 pack 108, which constitutes everything required to get the game started on the client device. In one embodiment, the developer of the application can select the application resources to be included in the app start bundle based on their tags (e.g., all application resources tagged "Level 1" are selected in the example above). Because the other on demand resources (e.g., those in the Levels 2 and 3 packs) can be left off of the app start bundle 140, the application can take up much less space on the client device initially than if the whole application is downloaded in a single bundle.

After the game 100 is installed and as the user progresses through level 1 of the game, the asset packs required to run the subsequent level(s) can be requested and installed on the client device. Various conditions for requesting and installing asset packs can be set, based, for example, on how and/or when the asset packs are utilized. In addition, the level 1 asset pack may no longer be needed after the user completes level 1 in the game and can thus be removed from the client device if necessary. An exemplary method of dynamically updating asset packs (i.e., on demand resources) on the client device is described in the following paragraphs with reference to FIGS. 3 and 4.

Figure 3:
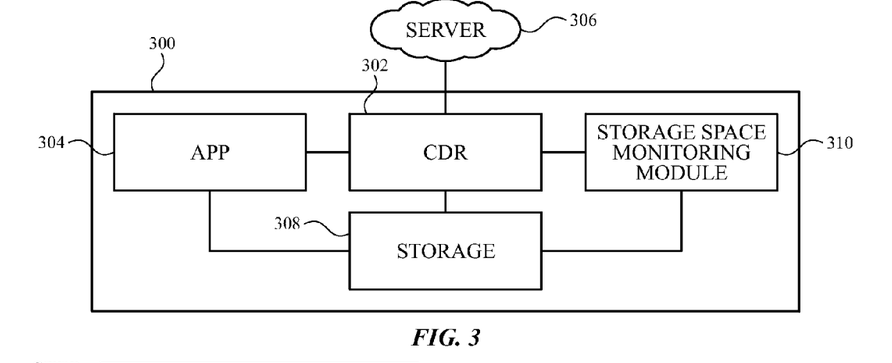
FIG. 3 illustrates the exemplary modules of a client device and their interactions in managing the application resources of one or more applications on the device, according to an embodiment of the disclosure.

FIG. 3 illustrates the exemplary modules of a client device and their interactions in managing the application resources of one or more applications on the device, according to an embodiment of the disclosure. In particular, the client device 300 can include an on demand resources daemon (ODR) 302 that is part of the operating system (OS) of the device. ODR 302 can be programmed to handle all aspects of application resource management across multiple applications on the client device. In particular, ODR 302 can monitor the usage of the applications and the available storage space on the device and fetch and purge on demand resources on an as-needed basis. Being a daemon, ODR 302 can typically perform its tasks in the background, without being directly controlled by an interactive user.

As illustrated in FIG. 3, ODR 302 can be in communication with an application 304 on the client device. Although only one application 304 is illustrated in FIG. 3, it should be understood that ODR 302 can interact with multiple applications and perform the same functions with regard to each application. In this embodiment, application 304 can be an application built with on demand resources so that only some of the resources are part of the initial download and reside on the client device 300. The rest of the on demand resources can be saved in one or more asset packs stored on the remote server 306.

An area in storage medium 308 of the client device 300 can be designated as the storage area for application resources of the various applications 304 on the device 300. This designated storage area 308 can be accessible to ODR 302 to update the collection of application resources therein. Optionally, the client device 300 can also include a storage space monitoring module (or Cache Delete module) 310 that can be configured to monitor the available storage space (including the designated storage area 308 for the application resources) on the client device 300 and communicate with ODR 302 when a shortage of storage space is detected.

It should be understood that the client device 300 can include other hardware and software modules not shown in FIG. 3 for clarity purposes. For example, the client device 300 can include a processor for running the applications and other programs on the device 300. It can also include additional storage space, network modules for communicating with other device (e.g., server 306) over one or more networks, input/output (I/O) devices such as a display, touch screen, and other sensors.

Figure 4:
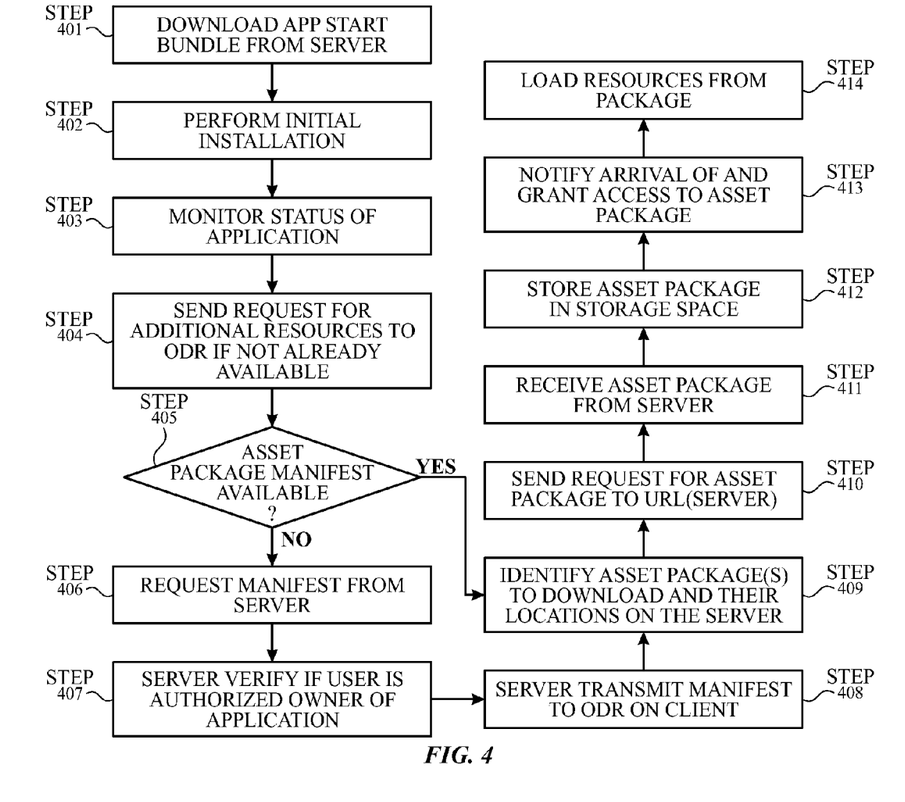
FIG. 4 illustrates the exemplary steps of setting up and running an application with on demand resources on a client device, according to an embodiment of the disclosure.

FIG. 4 illustrates the exemplary steps of setting up and running an application with on demand resources on a client device, according to an embodiment of the disclosure. When the user makes a request to download application 304 from an app store, the app start bundle of the application 304 can be sent from the remote server 306 to the client device 300 (step 401). Using the video game of FIG. 1 as an example, the app start bundle can include only the software code, base resources pack, and optionally the "Level 1" asset pack. Optionally, an authentication step can be included to verify that the user is authorized to download the application. This authentication step can be included if, for example, the application is an enterprise ODR application with access restricted to certain personnel in the company. The application can be installed on the device and the resources from the app start bundle (including any asset packs that are part of the initial download) can be saved in the local storage area 308 of the client device 300 (step 402). Once the application is successfully installed, a user can launch the application (game) and start playing level 1 of the game using the resources available locally on the client device. Assuming that the game is designed so that the user has to complete one level before moving on the next, application resources required for levels 2-N can remain on the server 306 during the initial stage of the game. Application 304 can monitor the user's progress in the game (step 403). When, for example, application 304 determines that the user is about to complete level 1, it can determine whether the next level (e.g., level 2) has been downloaded and is available locally. If not, a request for the next level can be sent to ODR 302 (step 404). Alternatively, a request for resources can be sent as soon as the user starts level 1 or when any other predefined triggering events are detected (e.g., after the user progresses to a predetermined point in the game).

When ODR 302 receives the request from application 304, it can first determine if an Asset Pack Manifest of the application is available (step 405). The Asset Pack Manifest can contain information regarding the order in which asset packs can be requested and the location of the asset pack on the network. If the Asset Pack Manifest is not available, ODR 302 can request it from the server (step 406). Some applications (e.g., a paid app) can require that the server verify that the entity (e.g., user or client device) requesting the Asset Pack Manifest is an authorized owner of the application and is thus entitled to receive the Asset Pack Manifest for the application (step 407). This verification can be performed using any suitable methods such as looking up the application in the user's purchase history. This verification step may either be skipped or always produce an affirmative response for some applications (e.g., a free application).

The server can then send the Asset Pack Manifest to ODR 302 on the client 300 (step 408). ODR can use the Asset Pack Manifest to identify which asset pack(s) to download next and its address (e.g., URL) on the network (step 409). A request for the asset pack(s) can then be formulated and sent to that address (step 410). In one embodiment, the request can include one or more tags (e.g., Level 2) that identify the on demand resources (and their corresponding asset packs) being requested.

There are additional security measures that can be incorporated in the Asset Pack Manifest to ensure that the asset packs are being requested by an authorized entity (e.g., a user who has purchased the application). In some embodiments, each URL in the Asset Pack Manifest can have an expiration time (e.g., twelve hours). So even if the Asset Pack Manifest is shared with an unauthorized entity, the URLs will only be valid for a limited period of time. To that end, even an authorized entity can be required to refresh the Asset Pack Manifest before requesting new asset packs from the server, if the local copy of the Asset Pack Manifest has expired.

Additionally or alternatively, the Asset Pack Manifest can include at least one "time bomb" URL for authenticate an asset pack request from ODR 302. This "time bomb" can be a security key created by hashing parts of a URL with a timestamp and a secret key that is only known to the server. When a request for an asset pack is sent to the server, the request can include the URL incorporated with the timestamp. When the server receives the request, it can determine whether the URL and the timestamp in the request can hash with the server's secret key to produce the correct security key. If the correct security key is produced, the server can release the requested asset pack(s). Otherwise, the request can be rejected.

Referring back to FIG. 4, after the request for an asset pack is validated, the server can ship the asset pack to the requesting ODR 302 on the client device 300 (step 411). The asset pack can be stored in the designated storage space 308 of the client device (step 412). In the meantime or thereafter, the application 304 can be notified by ODR 302 about the arrival of the new asset pack and granted the right to access it (step 413). The application can then load the asset pack (e.g., the level 2 pack) when the program calls for the application resources for level 1 (e.g., when the user completes level 1 and starts level 2) (step 414).

Steps 403-414 can be repeated as long as the application is running and new asset packs are needed based on the status (e.g., user progress) of the application. Some of these steps (e.g., steps 406-408) may be skipped if the Asset Pack Manifest on the client device has not expired. In the preferred embodiment, ODR 302 can anticipate the demand for the on demand resources based, for example, on the running status of the application, usage pattern data, and/or network strength, and automatically pre-fetch asset packs containing these resources before they are actually needed by the application 304. Depending on the platform of the client device (e.g., the type of device), ODR 302 can be programmed to be more or less aggressive in pre-fetching asset packs. If the device is one with relatively large storage space and/or inferior access to the network, ODR can be more aggressive in loading up asset packs so that the applications won't fail when the device loses its connection to the network and could not download additional resources. In contrast, the ODR of a device with a relatively small storage area but a fast and stable network connection can be less aggressive in pre-fetching on demand resources. Instead, the ODR of such as device would make more frequent requests as the resources become in demand.

This whole process of downloading on demand resources can be performed in the background without requiring any user input. The on demand resources can be made available transparently to the application as if they had already been part of the application from the initial installation. Indeed, the user would be unaware that parts of the application are being downloaded dynamically from the server at runtime.

As described above, by grouping the application resources associated with an application into asset packs, not all application resources have to reside on the client device at all times for the application to run normally. As a result, even the relatively large application can be installed on the client device without taking a lot of storage space. This in turn can free up storage space for other applications and data.

Not only can on demand resources associated with an application be obtained individually from the server when the application requests for them, the same on demand resources can be purged without affecting the rest of the application when they are no longer needed by the application for the near or long-term future. In some embodiments, on demand resources can be purged as soon as they are no longer in demand by the application. In other embodiments, on demand resources can be preserved on the device even when the application is no longer utilizing them. They can only be purged in response to a shortage of storage space on the device. In yet some other embodiments, on demand resources may be purged even if they may still be useful to the application. The criteria and priorities for purging resources can also be set by the developer when building the application.

Figure 5:
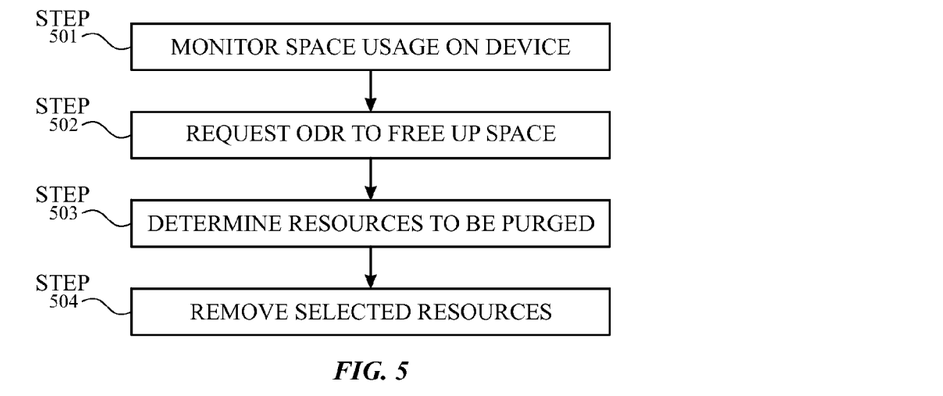
FIG. 5 illustrates the exemplary steps in purging application resources from the client device, according to an embodiment of the disclosure.

FIG. 5 illustrates the exemplary steps in purging application resources from the client device, according to an embodiment of the disclosure. The storage space monitoring module (Cache Delete module) 310 of FIG. 3 can monitor the space usage on the client device (step 501). When it detects a shortage of space as a result of, for example, the user trying to download a new application or content to the device 300, it can send a request to ODR 302 to free up some space for the new application/content (step 502). In some embodiments, ODR 302 can initiate a space-clearing process on its own without being notified of a shortage of available space. In response, ODR 302 can survey the asset packs stored in the designated storage space 308 and determine which asset pack contains resources that likely will not be utilized by the corresponding application and thus can be purged from the device 300 (step 503). Various criteria can be set regarding which resources are purgeable and the order in which they can be purged, as detailed in the paragraphs below. Preferably, ODR 302 is programmed not to attempt to purge from the storage area 308 a resource or asset pack containing a resource as long as it is still being requested by at least one application. After a selection is made with regard to which asset pack (or application) is to be purged, ODR 302 can delete it from the storage area 308 (step 504).

In various embodiments, ODR 302 can be programmed to select on demand resources for purging based on one or more different criteria. In one embodiment, ODR 302 can simply purge any or all on demand resources that are no longer in demand (e.g., not requested by any applications). When an asset pack and its application resources are no longer being requested by the application and are unlikely to be needed again in the near future, the asset pack/resources can be marked as purgeable and/or placed towards the top of a list of candidates for purging. If an asset pack is still being called upon by the application and/or is expected to continue to be utilized to at least some extent, the asset pack can be marked as preserved and/or ranked lower on the purging list. For example, if the user has completed level 1 in the game, but is still working through level 2, the asset pack, "Level 2," can be marked "preserved" and/or ranked lower than the asset pack, "Level 1," on the purging list. The purging list can include asset packs/resources associated with one or more applications that are installed on the client device. The rankings of the asset packs/resources can change dynamically based, at least partially, on the running status of the applications.

Additionally or alternatively, ODR 302 can make the selection based on the preferences set by the application developer. These preferences can be stored as part of the metadata associated with each asset pack in the Asset Pack Manifest. For example, the developer can set a "Never Delete" flag associated with one asset pack to 1 to indicate that this particular asset pack should always remain on the client device as long as the application is not deleted from the device. If the same flag for another asset pack is set to 0, that asset pack can then be a candidate for purging. As another example, the developer can set a priority number for each asset pack (or on demand resource) in the application. The priority number can indicate a preferred purging order among the various asset packs (or resources) of the application. When ODR 302 looks to free space on the device, it can search for asset packs with, for example, the lowest priority number.

Additionally or alternatively, heuristics can be built into purging (and/or download) orders. In particular, different usage patterns of an application can be collected across a number of client devices. Based on these usage patterns, predictions can be made regarding the order in which the asset packs are likely utilized at different stages during the running of the application. The usage patterns may also reveal, for example, an overall utilization rate of each of the asset packs. It may also reveal how often and/or when an application is likely to be used by a particular user. For example, if an application is typically only being used during the weekends, it can be a likely candidate for purging after each weekend if storage space becomes tight. It can be reinstalled before the weekends by removing other applications/resources that are less likely to be used over the weekends.

As another example, if a user has downloaded the same application onto multiple client devices, his progress in the application on the first device can be tracked and saved on a remote server so that when he moves on to a second device, the application resources needed to resume his session can be pre-fetched onto the second device before he starts using the application on the second device.

As yet another example, if an application on the client device is shared by multiple users, each user's usage of the application can be tracked separately on the client side based, for example, on their device/application logins. When a first user is logged onto the client device/application, ODR 302 can determine, based on the user's prior app usage pattern, whether the applications/asset packs that he will likely use are available on the device. If not, ODR can request these applications/asset packs from the server as soon as the user logs onto the device. In some embodiments, if not enough storage space is available on the device, ODR may purge other applications/asset packs that were downloaded by other users. When a second user logs onto the device, his applications/asset packs may be automatically loaded onto the device and the applications/asset packs associated with the first user can be removed to free up storage space, if necessary. If multiple users share the same application or asset pack(s) of an application, the application or asset pack(s) can remain on the device regardless of which user is logged on to the device.

Depending on the platform of the client device (e.g., the type of device), ODR 302 can also be programmed to be more or less aggressive in purging asset packs. If the device is one with relatively large storage space and/or inferior access to the network, ODR can be less aggressive in purging asset packs. In contrast, the ODR of a device with a relatively small storage area but a fast and stable network connection can be more aggressive in purging on demand resources.

In one embodiment, the asset packs can be associated with not only an application, but also a particular version of the application. Typically, a new version of the application can be rolled out when changes have been made to the application. Because the various resources of applications disclosed in the embodiments of the present disclosure can be grouped into multiple asset packs, there may not be any changes to at least some of the asset packs when a new version of the application rolls out. If the changes in the new version are relatively minor, most of the asset packs may not need to be refreshed. Only those asset packs that have been updated need to be downloaded again to replace the previous version. In one embodiment, the content of each asset pack can be hashed to create a content hash, which can be used to determine if any of the content has changed when a new version of the asset pack is released. If the content hash for the new version remains the same as that of the current version, there is no need to download the particular asset pack again. If the content hash for the new version does not match with that of the current version, the new version of the asset pack can be downloaded to replace the current version. Preferably, the content hash can remain the same even if some of the not so relevant information (e.g., timestamp, code signatures, and other metadata) associated with the asset pack changes. The content hash should only change if the actual content (i.e., resources) in the asset pack changes.

Figure 6:
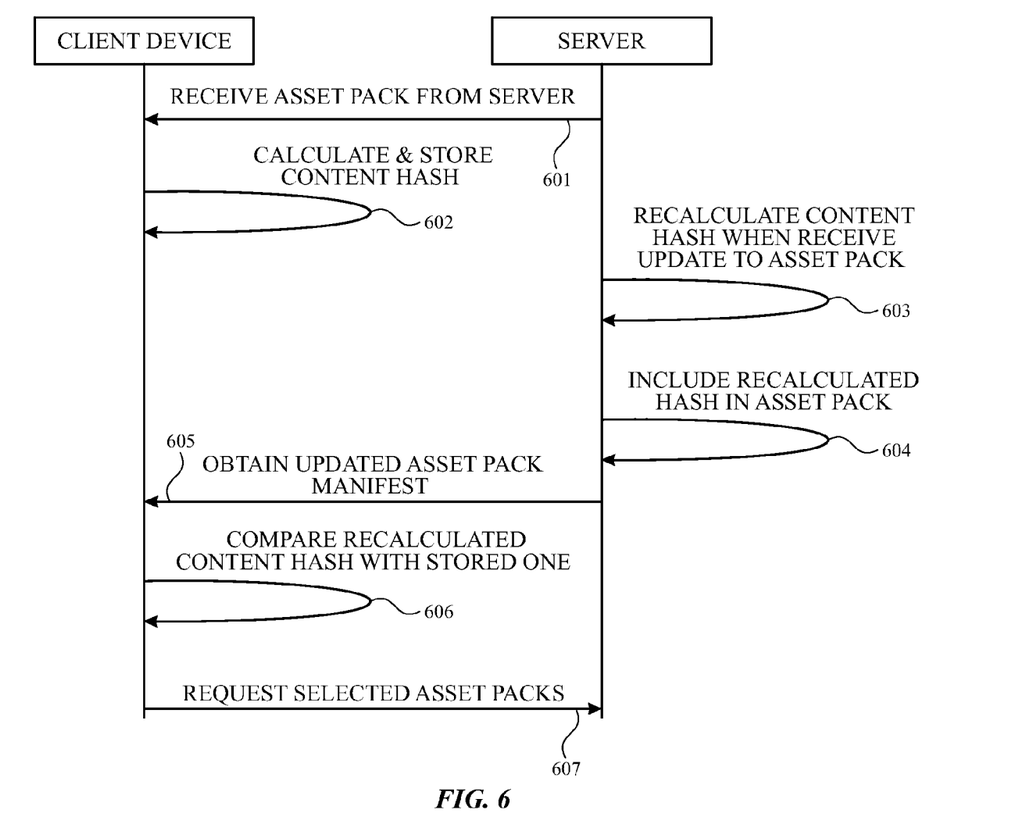
FIG. 6 illustrates the exemplary steps in updating an application with on demand resources to a new version, according to an embodiment of the disclosure.

FIG. 6 illustrates the exemplary steps in updating an application with on demand resources to a new version, according to an embodiment of the disclosure. First, when the client device receives an asset pack (or an app start bundle) from the server for the first time (step 601), it can calculate and store a content hash based on the actual content (i.e., resources) in the asset pack (or app bundle) (step 602). When the server receives a new update of the application, it can recalculate the content hash for each asset pack/bundle in the application (step 603). The recalculated content hashes can be included in the Asset Pack Manifest (step 604). When the client device requests the latest Asset Pack Manifest, it can also obtain the recalculated content hashes for all asset packs (step 605). The client device can then compare the recalculated content hashes with the respective ones stored locally to identify the asset packs that have changed (step 606). The client device can then request only those identified asset packs instead of downloading all asset packs for the application update (step 607). To use content hashes for verifying updates to asset packs, each asset pack can include an identifier that can remain stable through the version updates. In one embodiment, the tag (or combination of tags) associated with each asset pack can be used as the identifier of that asset pack.

In another aspect of the disclosure, an application program interface (API) (or a set of APIs) can be provided to the developers of the applications to build applications with on demand resources.

An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API-implementing component.

An API allows a developer of an API-calling component (which may be a third party developer) to leverage specified features provided by an API-implementing component. There may be one API-calling component or there may be more than one such component. An API can be a source code interface that a computer system or program library provides in order to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some embodiments the API-implementing component may provide more than one API, each providing a different view of or with different aspects that access different aspects of the functionality implemented by the API-implementing component. For example, one API of an API-implementing component can provide a first set of functions and can be exposed to third party developers, and another API of the API-implementing component can be hidden (not exposed) and provide a subset of the first set of functions and also provide another set of functions, such as testing or debugging functions which are not in the first set of functions. In other embodiments the API-implementing component may itself call one or more other components via an underlying API and thus be both an API-calling component and an API-implementing component.

An API defines the language and parameters that API-calling components use when accessing and using specified features of the API-implementing component. For example, an API-calling component accesses the specified features of the API-implementing component through one or more API calls or invocations (embodied for example by function or method calls) exposed by the API and passes data and control information using parameters via the API calls or invocations. The API-implementing component may return a value through the API in response to an API call from an API-calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API-calling component) and an API-implementing component. Transferring the API calls may include issuing, initiating, invoking, calling, receiving, returning, or responding to the function calls or messages; in other words, transferring can describe actions by either of the API-calling component or the API-implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API-implementing component. Thus, the API-calling component may declare variables, use pointers to, use or instantiate constant values of such types or classes by using definitions provided in the API.

Generally, an API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module (it should be understood that the API-implementing component and the API-calling component may be the same or different type of module from each other). API-implementing components may in some cases be embodied at least in part in firmware, microcode, or other hardware logic. In some embodiments, an API may allow a client program to use the services provided by a Software Development Kit (SDK) library. In other embodiments an application or other client program may use an API provided by an Application Framework. In these embodiments the application or client program may incorporate calls to functions or methods provided by the SDK and provided by the API or use data types or objects defined in the SDK and provided by the API. An Application Framework may in these embodiments provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low level logic that executes in part on the hardware component.

The API-calling component may be a local component (i.e., on the same data processing system as the API-implementing component) or a remote component (i.e., on a different data processing system from the API-implementing component) that communicates with the API-implementing component through the API over a network. It should be understood that an API-implementing component may also act as an API-calling component (i.e., it may make API calls to an API exposed by a different API-implementing component) and an API-calling component may also act as an API-implementing component by implementing an API that is exposed to a different API-calling component.

The API may allow multiple API-calling components written in different programming languages to communicate with the API-implementing component (thus the API may include features for translating calls and returns between the API-implementing component and the API-calling component); however the API may be implemented in terms of a specific programming language. An API-calling component can, in one embedment, call APIs from different providers such as a set of APIs from an OS provider and another set of APIs from a plug-in provider and another set of APIs from another provider (e.g. the provider of a software library) or creator of the another set of APIs.

Figure 7:
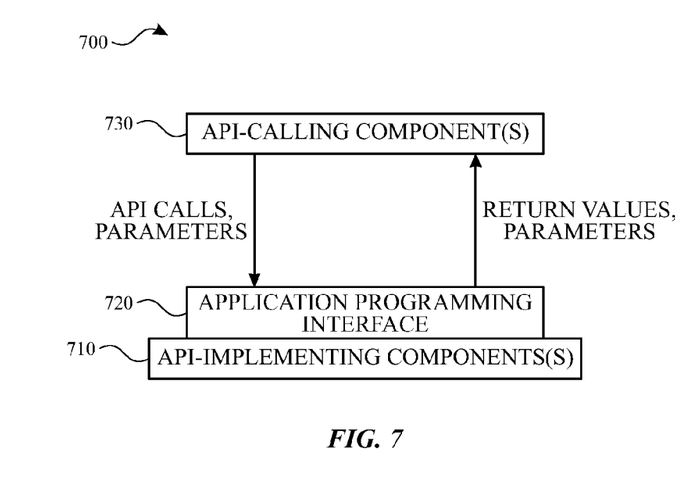
FIG. 7 is a block diagram illustrating an exemplary API architecture, which may be used in some embodiments of the disclosure.

FIG. 7 is a block diagram illustrating an exemplary API architecture, which may be used in some embodiments of the disclosure. As shown in FIG. 7, the API architecture 700 includes the API-implementing component 710 (e.g., an operating system, a library, a device driver, an API, an application program, software or other module) that implements the API 720. The API 720 specifies one or more functions, methods, classes, objects, protocols, data structures, formats and/or other features of the API-implementing component that may be used by the API-calling component 730. The API 720 can specify at least one calling convention that specifies how a function in the API-implementing component receives parameters from the API-calling component and how the function returns a result to the API-calling component. The API-calling component 730 (e.g., an operating system, a library, a device driver, an API, an application program, software or other module), makes API calls through the API 720 to access and use the features of the API-implementing component 710 that are specified by the API 720. The API-implementing component 710 may return a value through the API 720 to the API-calling component 730 in response to an API call.

It will be appreciated that the API-implementing component 710 may include additional functions, methods, classes, data structures, and/or other features that are not specified through the API 720 and are not available to the API-calling component 730. It should be understood that the API-calling component 730 may be on the same system as the API-implementing component 710 or may be located remotely and accesses the API-implementing component 710 using the API 720 over a network. While FIG. 7 illustrates a single API-calling component 730 interacting with the API 720, it should be understood that other API-calling components, which may be written in different languages (or the same language) than the API-calling component 730, may use the API 720.

The API-implementing component 710, the API 720, and the API-calling component 730 may be stored in a machine-readable medium, which includes any mechanism for storing information in a form readable by a machine (e.g., a computer or other data processing system). For example, a machine-readable medium includes magnetic disks, optical disks, random access memory; read only memory, flash memory devices, etc.

Figure 8:
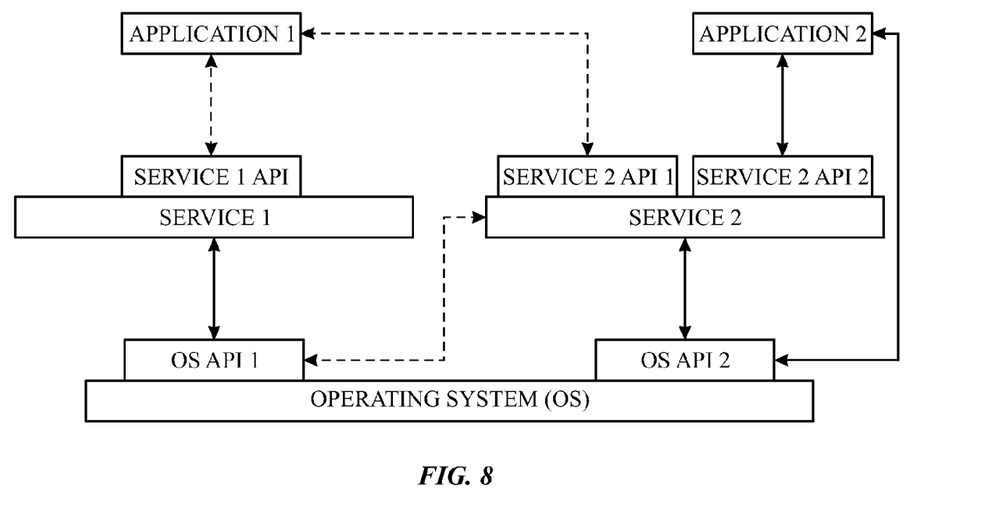
FIG. 8 is a diagram illustrating the exemplary interactions among the components of a system, according to the embodiments of the disclosure.

In FIG. 8 ("Software Stack"), an exemplary embodiment, applications can make calls to Services A or B using several Service APIs and to Operating System (OS) using several OS APIs. Services A and B can make calls to OS using several OS APIs.

Note that the Service 2 has two APIs, one of which (Service 2 API 1) receives calls from and returns values to Application 1 and the other (Service 2 API 2) receives calls from and returns values to Application 2. Service 1 (which can be, for example, a software library) makes calls to and receives returned values from OS API 1, and Service 2 (which can be, for example, a software library) makes calls to and receives returned values from both OS API 1 and OS API 2. Application 2 makes calls to and receives returned values from OS API 2.

An embodiment of the API disclosed herein can include the following exemplary data structures (e.g., object classes), parameters, and routines. It should be understood that these examples can be implemented in any suitable programming languages such as Objective C.

In this exemplary implementation, a resource request object can manage the availability of on demand resources that are virtually part of the application but are stored remotely. The application can use the request to inform the system when the associated resources are needed and when it has finished using them. The resource request can then download any resources not already cached on the device and inform the application when the resources are ready for use.

Optional settings can provide hints on the relative priority of the downloading and purging groups of resources. Groups can be marked as required for the application. Depending on the platform, the system can be prevented from deleting these resources from storage, or they are downloaded when the application is launched. Each resource request can be used only once for accessing resources.

Each resource request object can manage a group of related on demand resources. Tags can be created for each set of related resources and assigned to the on demand resources being before the application is built. A resource request can include the set of tags for the resources it manages. The resource request can only download resources not already on the device. Downloaded resources can be accessed the same way as those in the app start bundle. Accessing a resource that has not been downloaded can behave the same way as accessing a resource that does not exist in the app.

The system may not attempt to purge a resource from on-device storage as long as one resource request object can access it. Access can end in response to a call to end access or when the resource request object is deallocated.

On demand resources can be persevered after no resource requests objects are accessing them. As the system requires more storage space, the resources can be purged. A tagged group of resources can have a relative preservation priority. The system can attempt to purge lower priority resources first.

Tagged resources can be set as required for the application. For some platforms this can prevent the resource being deleted from storage when they are no longer being accessed, including preserving them across application launches. On other platforms, the system can download the resources before launching the application. Resources that are marked as permanently preserved can count towards the total storage used by the application.

The APIs can provide the following exemplary functions. For example, an initialized resource request for managing remote resources tagged with a specified identifier can be created based on a call using the name of the tag (or tags) specifying one or more resources stored in the main bundle as input. The value of each tag can correspond to the identifier assigned to a logical grouping of resources. The bundle used to store the loaded resources can be specified by including an optional "bundle" parameter in the call. The configuration of a resource request can be accessed by using a reference to the bundle used for storing the downloaded resources. The bundle can be the main bundle or the one specified in the API call.

The APIs can also provide a way to configure the priority of each resource request. The system can then attempt to give priority to resource requests with higher values. The priority of a resource request can be changed at any time, even after the resource request has started.

The APIs can also provide a way to request access to the resources managed by a resource request object. The access to resources can be conditioned on whether the resources managed by the resource request object are already on the device. If they are, the system can begin accessing the resources. If the resources are not on the device, they can be requested from the server. The system can be prevented from purging resources while they can still be accessed.

The APIs can additionally provide a way to inform the system that the resources associated with a resource request object are no longer being accessed. This method can be called when the resource request object is deallocated. The APIs can also provide a way to track the progress of a resource request.

In addition, the APIs can also provide a way for configuring caching priority (e.g., the relative order for purging resources). This call can require a priority parameter that can be a number specifying the relative priority of preserving the resources in the group specified by the corresponding tag(s). The system can attempt to purge cached resources with lower priorities first. In addition, a Boolean value can be used for specifying whether the system can purge the resources associated with the specified tag(s). Resources marked for preserving can be made available across application launches. Depending on the platform, this may be done by preventing the system from purging them or by downloading them when the application is launched. One of the common reasons for preserving resources can be offline use.

In addition, the APIs can provide a way to post notifications after the resources request system detects the amount of available disk space for downloaded resources is getting low. After receiving the notification, the application can try to free up disk space by, for example, releasing any on demand resources that are no longer required. If the application is in the background and the application does not free up enough space, it can be terminated.

The above-described systems and methods of building, deploying, running, and updating applications with on demand resources can be implemented in software, firmware, hardware, and/or any combination of the three. In the embodiments where the one or more of the modules are implemented in software, they can be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium that can contain or store the program for use by or in connection with the instruction execution system, apparatus, or device. The non-transitory computer readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like. The non-transitory computer readable storage medium can be part of the storage medium of a computing device.

It should be understood that although the above embodiments are described with reference to a video game, any type of software application can be implemented using the disclosed systems and methods.

Although embodiments have been fully described with reference to the accompanying drawings, it is to be noted that various changes and modifications will become apparent to those skilled in the art. Such changes and modifications are to be understood as being included within the scope of the various embodiments as defined by the appended claims.

What is claimed is:

1. A computer-implemented method for building a software application, comprising:
   generating a plurality of application resources;
   creating a plurality of tags;
   applying a respective tag of the plurality of tags on each of the plurality of application resources, wherein a first tag is applied to a first application resource and to a second application resource, different than the first application resource, of the plurality of application resources, and a second tag is applied to the second application resource of the plurality of application resources;
   grouping the application resources by their tags to form at least two asset packs, each asset pack identifiable by at least one tag shared by all application resources in the asset pack, wherein the first application resource and the second application resource are grouped in a first asset pack associated with the first tag, and the second application resource is grouped in a second asset pack associated with the second tag, different from the first asset pack;
   creating an asset pack manifest comprising a location of each of the asset packs and an order in which the asset packs are to be downloaded;
   receiving, from a client, a request for an asset pack associated with a tag; and
   in response to receiving the request for the asset pack associated with the tag:
      in accordance with a determination that the request is for an asset pack associated with the first tag, transmitting, to the client, the first asset pack including the first application resource and the second application resource; and
      in accordance with a determination that the request is for an asset pack associated with the second tag, transmitting, to the client, the second asset pack including the second application resource but not the first application resource.

2. The computer-implemented method of claim 1, comprising: generating an on demand resource list matching the application resources with their respective asset packs.

3. The computer-implemented method of claim 1, wherein the asset pack manifest further comprises a content hash for each of the asset packs, the content hash associated with a version of the software application.

4. The computer-implemented method of claim 3, comprising recalculating the content hashes in response to changes to the application resources.

5. The computer-implemented method of claim 3, wherein the content hashes are calculated based on the application resources in the corresponding asset packs.

6. The computer-implemented method of claim 1, comprising creating an app start bundle including software code different from the application resources, the software code comprising an executable for launching the software application.

7. A computer-implemented method of updating an application on a device, the application including a first plurality of asset packs, the method comprising:
   storing a first asset pack manifest comprising a content hash for each of the first plurality of asset packs on the device, wherein each asset pack includes a plurality of application resources;
   regularly requesting an updated asset pack manifest from a network source storing a second plurality of asset packs for the application, the updated asset pack manifest comprising a recalculated content hash for each of the first plurality of asset packs;
   comparing each recalculated content hash in the updated asset pack manifest with each stored content hash in the first asset pack manifest for each of the first plurality of asset packs;
   requesting, from the network source, the asset packs of the first plurality of asset packs for which the recalculated content hash in the updated asset pack manifest is different from the stored content hash in the first asset pack manifest; and
   forgoing requesting, from the network source, the asset packs of the first plurality of asset packs for which the recalculated content hash in the updated asset pack manifest is the same as the stored content hash in the first asset pack manifest.

8. The computer-implemented method of claim 7, wherein the content hash of an asset pack is calculated based on content in the asset pack.

9. The computer-implemented method of claim 7, wherein each of the first plurality of asset packs is identified by a tag associated with each asset pack of the first plurality of asset packs.

10. A non-transitory computer readable medium, the computer readable medium containing instructions, that, when executed, perform a method for building a software application, the method comprising:

generating a plurality of application resources;
creating a plurality of tags;
applying a respective tag of the plurality of tags on each of the plurality of application resources, wherein a first tag is applied to a first application resource and to a second application resource, different than the first application resource, of the plurality of application resources, and a second tag is applied to the second application resource of the plurality of application resources;
grouping the application resources by their tags to form at least two asset packs, each asset pack identifiable by at least one tag shared by all application resources in the asset pack, wherein the first application resource and the second application resource are grouped in a first asset pack associated with the first tag, and the second application resource is grouped in a second asset pack associated with the second tag, different from the first asset pack;
creating an asset pack manifest comprising a location of each of the asset packs and an order in which the asset packs are to be downloaded;
receiving, from a client, a request for an asset pack associated with a tag; and
in response to receiving the request for the asset pack associated with the tag:
  in accordance with a determination that the request is for an asset pack associated with the first tag, transmitting, to the client, the first asset pack including the first application resource and the second application resource; and
  in accordance with a determination that the request is for an asset pack associated with the second tag, transmitting, to the client, the second asset pack including the second application resource but not the first application resource.

11. A non-transitory computer readable medium, the computer readable medium containing instructions, that, when executed, perform a method of updating an application on a device, the application including a first plurality of asset packs, the method comprising:
storing a first asset pack manifest comprising a content hash for each of the first plurality of asset packs on the device, wherein each asset pack includes a plurality of application resources;
regularly requesting an updated asset pack manifest from a network source storing a second plurality of asset packs for the application, the updated asset pack manifest comprising a recalculated content hash for each of the first plurality of asset packs;
comparing each recalculated content hash in the updated asset pack manifest with each stored content hash in the first asset pack manifest for each of the first plurality of asset packs;
requesting, from the network source, the asset packs of the first plurality of asset packs for which the recalculated content hash in the updated asset pack manifest is different from the stored content hash in the first asset pack manifest; and
forgoing requesting, from the network source, the asset packs of the first plurality of asset packs for which the recalculated content hash in the updated asset pack manifest is the same as the stored content hash in the first asset pack manifest.

12. A system comprising:
one or more processors;
memory; and
one or more programs, wherein the one or more programs are stored in the memory and are configured to be executed by the one or more processors, which when executed by the one or more processors, cause the system to perform a method for building a software application, the method comprising:
generating a plurality of application resources;
creating a plurality of tags;
applying a respective tag of the plurality of tags on each of the plurality of application resources, wherein a first tag is applied to a first application resource and to a second application resource, different than the first application resource, of the plurality of application resources, and a second tag is applied to the second application resource of the plurality of application resources;
grouping the application resources by their tags to form at least two asset packs, each asset pack identifiable by at least one tag shared by all application resources in the asset pack, wherein the first application resource and the second application resource are grouped in a first asset pack associated with the first tag, and the second application resource is grouped in a second asset pack associated with the second tag, different from the first asset pack;
creating an asset pack manifest comprising a location of each of the asset packs and an order in which the asset packs are to be downloaded;
receiving, from a client, a request for an asset pack associated with a tag; and
in response to receiving the request for the asset pack associated with the tag:
  in accordance with a determination that the request is for an asset pack associated with the first tag, transmitting, to the client, the first asset pack including the first application resource and the second application resource; and
  in accordance with a determination that the request is for an asset pack associated with the second tag, transmitting, to the client, the second asset pack including the second application resource but not the first application resource.

13. A system comprising:
one or more processors;
memory; and
one or more programs, wherein the one or more programs are stored in the memory and are configured to be executed by the one or more processors, which when executed by the one or more processors, cause the system to perform a method of updating an application on a device, the application including a first plurality of asset packs, the method comprising:
storing a first asset pack manifest comprising a content hash for each of the first plurality of asset packs on the device, wherein each asset pack includes a plurality of application resources;
regularly requesting an updated asset pack manifest from a network source storing a second plurality of asset packs for the application, the updated asset pack manifest comprising a recalculated content hash for each of the first plurality of asset packs;
comparing each recalculated content hash in the updated asset pack manifest with each stored content hash in the first asset pack manifest for each of the first plurality of asset packs;
requesting, from the network source, the asset packs of the first plurality of asset packs for which the recalculated content hash in the updated asset pack manifest is different from the stored content hash in the first asset pack manifest; and forgoing requesting, from the network source, the asset packs of the first plurality of asset packs for which the recalculated content hash in the updated asset pack manifest is the same as the stored content hash in the first asset pack manifest.

14. The computer-implemented method of claim 7, wherein:

the updated asset pack manifest associated with the application is requested from the network source in response to a determination that the first asset pack manifest associated with the application on the device has expired.

15. The non-transitory computer readable medium of claim 11, wherein:

the updated asset pack manifest associated with the application is requested from the network source in response to a determination that the first asset pack manifest associated with the application on the device has expired.

16. The system of claim 13, wherein:

the updated asset pack manifest associated with the application is requested from the network source in response to a determination that the first asset pack manifest associated with the application on the device has expired.

17. The non-transitory computer readable medium of claim 10, the method further comprising:

creating an app start bundle including software code different from the application resources, the software code comprising an executable for launching the software application.

18. The system of claim 12, the method further comprising:

creating an app start bundle including software code different from the application resources, the software code comprising an executable for launching the software application.

19. The non-transitory computer readable medium of claim 11, wherein the content hash of an asset pack is calculated based on content in the asset pack.

20. The system of claim 13, wherein the content hash of an asset pack is calculated based on content in the asset pack.

* * * * *